US012379309B2

(12) United States Patent
Leen et al.

(10) Patent No.: US 12,379,309 B2
(45) Date of Patent: **\*Aug. 5, 2025**

(54) CELL AND OPTICAL CAVITY FOR ABSORPTION SPECTROSCOPY AND METHODS OF ASSEMBLY

(71) Applicant: Nikira Labs Inc., Mountain View, CA (US)

(72) Inventors: John Brian Leen, Sunnyvale, CA (US); Manish Gupta, Mountain View, CA (US); Rupal Gupta, Mountain View, CA (US)

(73) Assignee: Nikira Labs Inc., Mountain View, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/207,936

(22) Filed: Jun. 9, 2023

(65) Prior Publication Data

US 2024/0410823 A1    Dec. 12, 2024

(51) Int. Cl.
*G01N 21/31* (2006.01)

(52) U.S. Cl.
CPC ... *G01N 21/31* (2013.01); *G01N 2201/06113* (2013.01); *G01N 2201/0636* (2013.01)

(58) Field of Classification Search
CPC ......... G01N 21/31; G01N 2201/06113; G01N 2201/0636
See application file for complete search history.

(56) References Cited

U.S. PATENT DOCUMENTS

| | | | |
|---|---|---|---|
| 3,652,954 | A | 3/1972 | Snitzer |
| 4,793,709 | A | 12/1988 | Jabr et al. |
| 5,291,265 | A | 3/1994 | Kebabian |
| 5,432,610 | A | 7/1995 | King et al. |
| 5,506,678 | A | 4/1996 | Carlsen et al. |
| 5,528,040 | A | 6/1996 | Lehmann |
| 5,912,740 | A | 6/1999 | Zare et al. |
| 6,795,190 | B1 | 9/2004 | Paul et al. |
| 7,307,716 | B2 | 12/2007 | Silver |
| 9,709,491 | B1 | 7/2017 | Murphy et al. |

(Continued)

FOREIGN PATENT DOCUMENTS

| | | |
|---|---|---|
| CN | 210231911 U | 4/2020 |
| DE | 3028415 A1 | 2/1982 |

(Continued)

OTHER PUBLICATIONS

Courtois, Jérémie; "High-speed off-axis Cavity Ring-Down Spectroscopy with a re-entrant configuration for spectral resolution enhancement"; Optical Society of America; (Mar. 1, 2010).

(Continued)

*Primary Examiner* — Hina F Ayub
(74) *Attorney, Agent, or Firm* — LOZA & LOZA, LLP; David S. Sarisky

(57) ABSTRACT

A cell for an optical cavity includes a tube with a first open-end and a second open-end, a first end-cap, and a second end-cap. The first end-cap is fixedly attached to the tube at the first open-end and has an opening with a center axis. The second end-cap is fixedly attached to the tube at the second open-end and has an opening with a center axis that is axially aligned with the center axis of the first end-cap.

16 Claims, 15 Drawing Sheets

(56) References Cited

U.S. PATENT DOCUMENTS

| | | | |
|---|---|---|---|
| 10,048,196 B2 | 8/2018 | Harb et al. | |
| 2011/0164251 A1* | 7/2011 | Richter | G01N 21/031 356/440 |
| 2016/0084757 A1 | 3/2016 | Miron | |
| 2021/0131947 A1 | 5/2021 | Pickrell et al. | |

FOREIGN PATENT DOCUMENTS

| | | |
|---|---|---|
| EP | 0596605 A1 | 5/1994 |
| EP | 2422225 A2 | 2/2012 |

OTHER PUBLICATIONS

Gupta, Manish; "Optimization of Off-Axis ICOS and Applications to Flow Tube Kinetics"; (Dec. 31, 2003).

Kasyutich, V.L.; "Laser beam patterns of an optical cavity formed by two twisted cylindrical mirrors"; (Jan. 5, 2009).

Liu, Jianhui; "Design and research of built-in sample cell with multiple optical reflections"; (Oct. 24, 2017).

McManus et al.; "Astigmatic mirror multipass absorption cells for long-path-length spectroscopy"; Appl. Opt. 34; 3336-3348 (1995).

Schwarm et al.; "Calibration-free breath acetone sensor with interference correction based on wavelength modulation spectroscopy near 8.2 μm"; Appl. Phys; B 126, 9 (2020).

Wang; "Development of a portable cavity-enhanced absorption spectrometer for the measurement of ambient NO3 and N2O5: experimental setup, lab characterizations, and field applications in a polluted urban environment"; (Sep. 27, 2016).

Herndon et al.; "Astigmatic Multipass Absorption Cells Lightweight Astigmatic Multipass Absorption Cell—AMAC-36LW"; Aerodyne Research; https://www.aerodyne.com/product/astigmatic-multipass-absorption-cells/; Printed Apr. 28, 2023; 6 pages.

Deal Spectroscopy; "Cavity Ring Down Spectroscopy Cell, 50 cm Pathlength, Adjustable Mounts for 1 in. OD Optics, Mounting Hardware Included."; https://www.idealspectroscopy.com/printRegproductbidealspectroscopy.asp?bid=1103; Printed Apr. 28, 2023; 2 pages.

PCT/US2024/029310. International Search Report & Written Opinion (Oct. 28, 2024).

\* cited by examiner

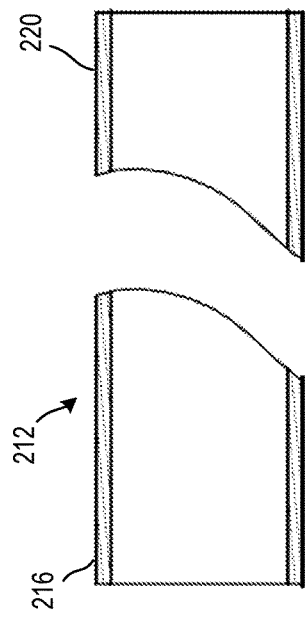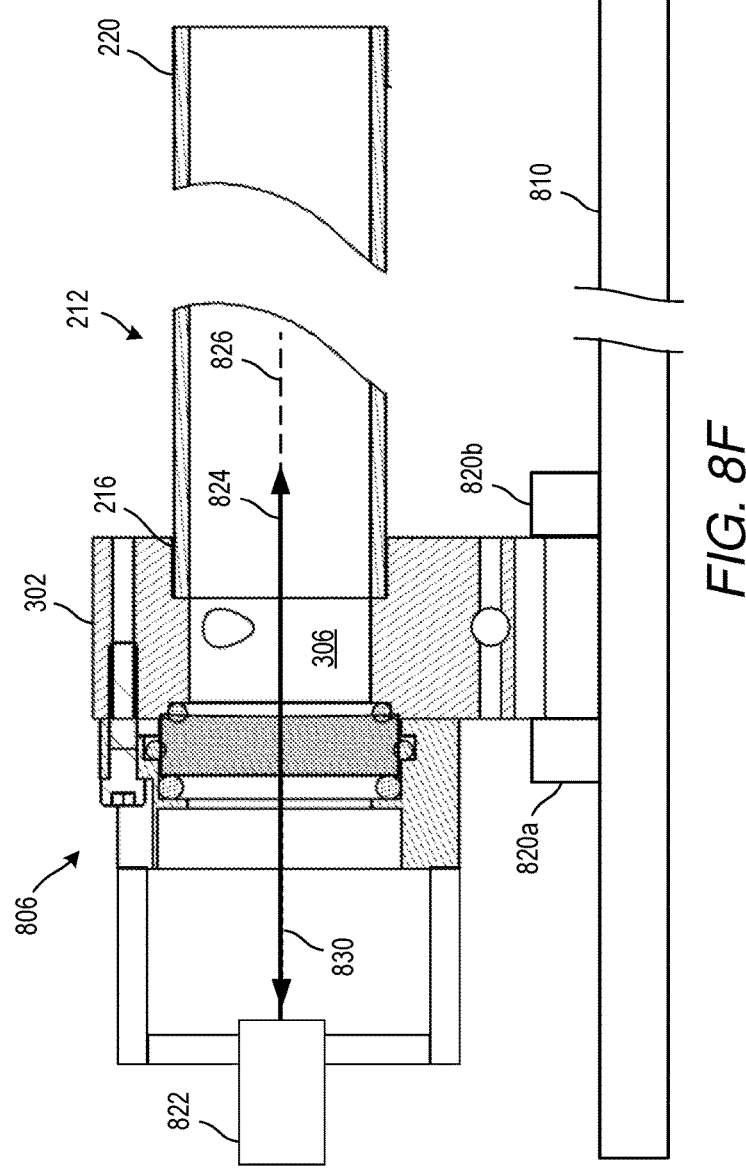

CELL AND OPTICAL CAVITY FOR ABSORPTION SPECTROSCOPY AND METHODS OF ASSEMBLY

GOVERNMENT LICENSE RIGHTS

This invention was made with government support under EPA Contract No. 68HERC22C0037. The government has certain rights in the invention.

TECHNICAL FIELD

The present disclosure relates generally to optical absorption spectroscopy, and more particularly, to a cell for an optical cavity and methods of assembling the cell, where the cell enables removal and replacement of mirrors without affecting the alignment of the optical cavity.

BACKGROUND

Methods for optical absorption spectroscopy rely on carefully aligned mirrors to reflect light through a sample under test multiple times. Because the number of reflections can be large (tens to thousands of bounces) the alignment of the two or more mirrors relative to one another is critical for the success of these methods. Examples of spectroscopic methods that require a high precision and stable mechanical structure to position optics are cavity ringdown spectroscopy (CRDS), integrated cavity output spectroscopy (ICOS), off-axis ICOS (OA-ICOS), cavity enhanced absorption spectroscopy (CEAS), and multi-pass absorption spectroscopy (e.g., White or Herriott cells).

The mechanical structure, referred to herein as a "cell," that contains the sample under test and holds the mirrors relative to one another, must satisfy tight tolerances, specifically for the tilt of the mirrors relative to the central optical axis of the cell and in some cases the mirror to mirror distance. Current approaches to manufacture cells that rigidly and stably hold two or more mirrors relative to one another are costly and complicated for various reasons.

One approach is to construct a cell from screwed/bolted together components with manually adjustable mirrors on flexible mounts that can be intermittently aligned by expert personnel. This is typically achieved by holding the mirrors in kinematic mounts while making the connection to the cell flexible using large o-rings or bellows. The alignment of the mirrors can then be adjusted to suit the application. This method is costly because of the time required for repeated alignment and also suffers from failure due to vibration or shock induced movement. It is thus typically only used in laboratory and research applications. See https://www.idealspectroscopy.com/printRegproductbidealspectroscopy-.asp?pid=1103 for an example of an expert adjustable cell.

A second approach is to machine a cell having mirror-holding ends from a single piece of material (e.g., aluminum, steel, invar, etc.) with tight tolerances on concentricity, parallelism and length of the mirror-holding ends. "Concentricity" as used herein means the center axis of the opening of the mirror-holding end at one end of the cell is aligned with the center axis of the opening of the mirror-holding end at the other end of the cell. "Parallelism" as used herein means the mirror-landing surface of the mirror-holding end at one end of the cell is parallel with the mirror-landing surface of the mirror-holding end at the other end of the cell. "Length" as used herein means the center-to-center separation between mirrors. This machining approach is possible for short cells (less than ~20 cm for 1" diameter mirrors), when machine tools can easily bore the center of the cell. Unfortunately, longer cells are often required and this approach is untenable for cells beyond about 30 cm and expensive for cells in the 10-30 cm range.

A variation of the second approach is to weld mirror-holding end-caps to the ends of an extruded tube or seam-welded tube. Welding, however, induces heat stress bending of the tube and the mirror-holding end-caps that affects the concentricity and parallelism of the cell. Furthermore, during assembly, once the mirror-holding ends caps are welded to the tube they cannot be adjusted to achieve concentricity and parallelism. Thus, the welded-on mirror-holding end-caps have to be machined to produce acceptable parallelism and concentricity. The cost of this multi-step fabrication is very high.

A third approach is to connect mirror-holding end-caps of a cell with rods using machine tolerances (e.g., +/−0.005") on the rods. This method is most commonly used for multi-pass cells where the alignment errors can be compensated for by adjusting the alignment of the input beam. This method is akin to the second approach above, but typically has lower tolerances. See https://www.aerodyne.com/product/astigmatic-multipass-absorption-cells/for an example of a bolted together multi-pass cell.

A fourth approach involves optically aligning mirrors on a cell using a laser and then permanently affixing the mirrors to the cell using adhesive. The mirrors, however, cannot be removed for cleaning or replacement. Although this method is often used for its robustness, the optical cavity cannot be serviced and must be discarded if it becomes excessively dirty.

In summary, current approaches to manufacture cells that rigidly and stably hold two or more mirrors relative to one another to achieve optical alignment of the mirrors depend on precisely machined mirror mounts or permanently affixing the mirrors to the cell. However, these methods are costly for long cells and prohibit mirror cleaning/replacement respectively.

SUMMARY

In one aspect, the disclosure relates to a cell for an optical cavity. The cell includes a tube with a first open-end and a second open-end, a first end-cap, and a second end-cap. The first end-cap is fixedly attached to the tube at the first open-end and has an opening with a center axis. The second end-cap is fixedly attached to the tube at the second open-end and has an opening with a center axis that is axially aligned with the center axis of the first end-cap. "Fixedly attached" as used herein means the first-end cap and the second end-cap are attached to the tube in a way that does not allow for separation of the components in a way that preserves the original form and structural integrity of the components. For example, components that are attached together by a screw are not fixedly attached as they can be separated by removing the screw, while components that are adhered or welded together are fixedly attached since they cannot be separated without altering the original form of the components or damaging the structural integrity of the components (e.g., cutting through the components).

In another aspect, the disclosure relates to a method of assembling a cell for an optical cavity. The method includes aligning a laser beam with an optical axis of a first mirror secured in a first end-cap that is secured in place relative to a surface; coupling a first open-end of a tube to the first end-cap; coupling a second end-cap to a second open-end of the tube; optically aligning the second end-cap with the first end-cap; securing the second end-cap in place relative to the surface; and fixedly attaching the first open end of the tube to the first end-cap and the second open end of the tube to the second end-cap. "Fixedly attaching" as used herein means attaching the first-end cap and the second end-cap to the tube in a way that does not allow for separation of the components in a way that preserves the original form and structural integrity of the components. For example, attaching two components together using a screw is not fixedly attaching the components as they can be separated by removing the screw, while attaching two components together using an adhesive or metal weld is fixedly attaching the components since they cannot be separated without altering the original form of the components or damaging the structural integrity of the components (e.g., cutting through the components).

In another aspect, the disclosure relates to an optical cavity. The optical cavity includes a cell and a first mirror and a second mirror removably coupled to the cell. The cell includes a tube with a first open-end and a second open-end. The first end-cap is fixedly attached at the first open-end and has an opening with a center axis. The second end-cap is fixedly attached at the second open-end and has an opening with a center axis that is optically aligned with the center axis of the first end-cap. The first mirror is removably coupled with the first end-cap by a first mirror clamp assembly such that the center of the first mirror is axially aligned with the center axis of the first end-cap. The second mirror is removably coupled with the second end-cap by a second mirror clamp assembly such that the center of the second mirror is axially aligned with the center axis of the second end-cap. "Removably coupled" as used herein means the first mirror (or second mirror) is coupled to the first end-cap (or second end-cap) in a way that allows for separation of the components in a way that preserves the original form and structural integrity of the components. For example, components that are attached together by a screw are removable coupled together as they can be separated by removing the screw without altering the original form and structural integrity of the components.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein:

FIGS. 8A through 8I are illustrations of various stages of the method of FIG. 7.

DETAILED DESCRIPTION

Disclosed herein is an optical cavity having a cell that enables removal and replacement of mirrors from the optical cavity without affecting the optical alignment of the cavity. The cell includes a preformed chamber, e.g., tube, and end-caps that are optically aligned and permanently attached to opposite ends of the tube such that respective mirror-landing surfaces of the end-caps are substantially parallel. "Substantially parallel" in this regard means that the mirror-landing surfaces are within x degree of being parallel.

Mirror clamps removably secure a respective cavity mirror at each of the end-caps. Because the end-caps are optically aligned and have substantially parallel mirror-landing surfaces, the mirrors secured to the end-caps are also optically aligned. Thus, the optically aligned and permanently attached end-caps serve as a repeatable mounting surface for the cavity mirrors without the need for high precision machining. Also disclosed herein is a method of assembling a cell of an optical cavity so its end-caps are permanently optically aligned and have substantially parallel mirror-landing surfaces.

The cell and optical cavity disclosed herein may be used in multi-pass and cavity enhanced absorption spectroscopies. For example, the optical cavity may be part of an optical system that performs absorption measurements, as described below.

Optical System

Figure 1:
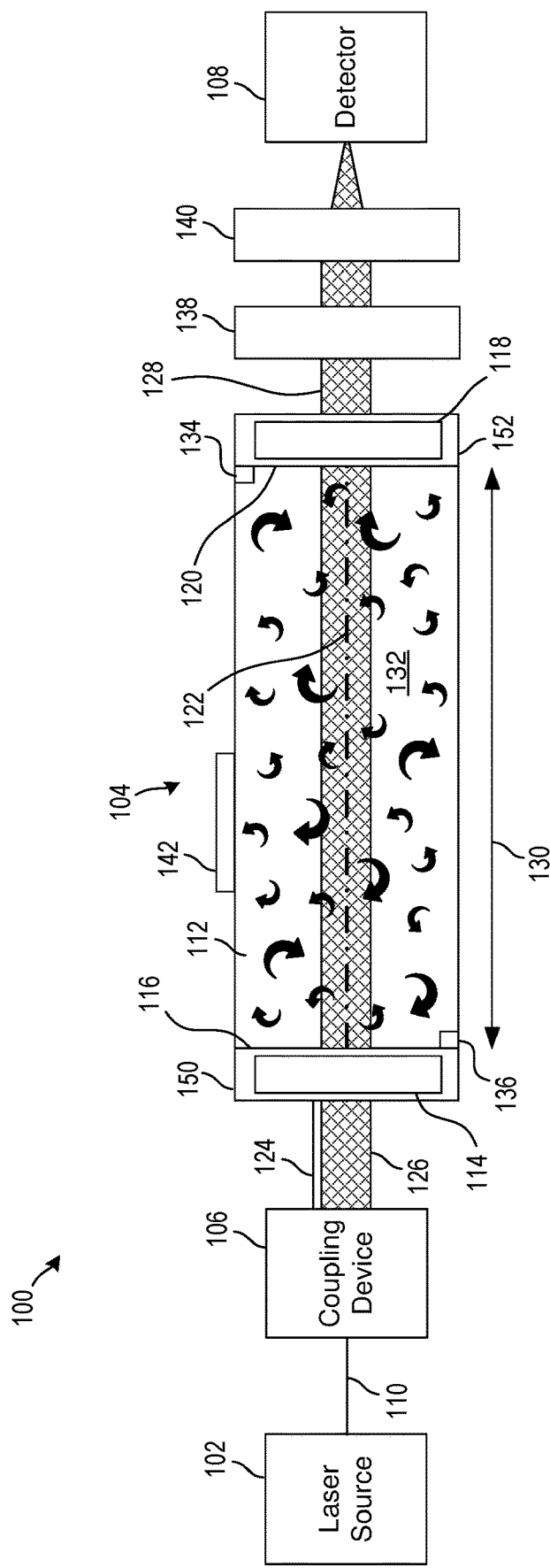
FIG. 1 is a schematic block diagram of an optical system having an optical cavity configured in accordance with embodiments disclosed herein.
Figure 2:
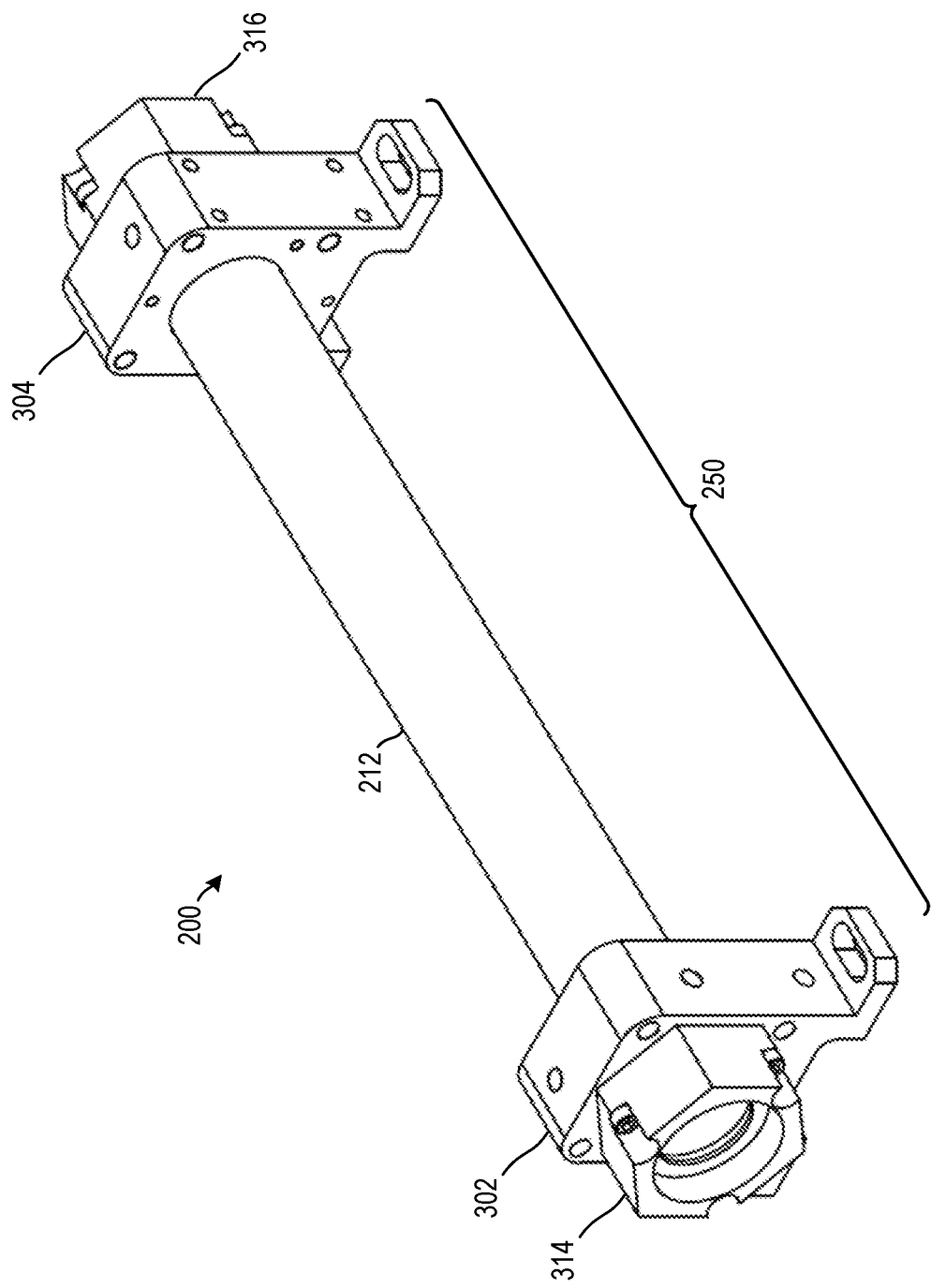
FIG. 2 is a perspective illustration of an optical cavity in accordance with embodiments disclosed herein.

With reference to FIG. 1, an optical system 100 for performing an absorption measurement of a medium sample 132 includes a laser source 102, an optical cavity 104 having a cell configured in accordance with embodiments disclosed herein, a coupling device 106, and a detector 108. The laser source 102 is configured to output a laser beam 110 having a wavelength corresponding to an absorption region of interest. The laser source 102 may be, for example, a distributed feedback, telecommunications-grade butterfly diode laser or quantum cascade laser or dye laser, having a wavelength that may span the entire spectral range from ultraviolet (UV) to infrared (IR).

The optical cavity 104 includes a tube 112, an input mirror 114 secured in place at an input end 116 of the tube by an end-cap 150, an output mirror 118 secured in place at an output end 120 of the tube by an end-cap 152, and an optical axis 122 that extends through the center of the input mirror and the center of the output mirror. The tube 112 and end-caps 150, 152 form the cell of the optical cavity 104. The tube 112 is configured to receive the medium sample 132 through an input valve 134 associated with the output end 120 of the tube, and to discharge the medium sample 132 through an output valve 136 associated with the input end 116 of the tube.

The coupling device 106 is configured to couple the laser beam 110 through the input mirror 114 into the tube 112 as one of a single narrow-diameter laser beam 124 or a large-diameter laser beam 126. In one configuration, the optical cavity 104 is high-reflective over a narrow spectral range, e.g., 1560-1650 nm. The detector 108 is optically coupled with the optical cavity 104, and is configured to detect an intensity of light 128 of the wavelength corresponding to the absorption region of interest that extends through the output mirror 118. In one configuration, the detector 108 is optically coupled with the optical cavity 104 through a bandpass filter 138 and a lens 140. The bandpass filter 138 blocks light that is outside the spectral range of the optical cavity 104 and thus mitigates stray noise and non-lasing light (broadband emission from the laser). The lens 140 focuses the light transmitted through the optical cavity 104 onto the detector 108.

Having generally described an optical system 100 having an optical cavity 104 with a cell configured in accordance with embodiments disclosed herein, embodiments of the optical cavity 104 and the cell are now described in detail.

Cell and Optical Cavity

With reference to FIGS. 2-6, an optical cavity 200 in accordance with embodiments disclosed herein includes a cell 250, a first mirror 214 at a first end of the cell, and a second mirror 218 at a second end of the cell. The first mirror 214 and the second mirror 218 are highly reflective mirrors having a reflectivity of, for example, greater than 90%. The cell 250 includes a tube 212, a first end-cap 302 at a first end of the tube and a second end-cap 304 at a second end of the tube. The tube 212 has a first open-end 216 and a second open-end 220. The tube may be pre-formed, e.g., extruded, roll-wrapped, seam welded. The tube 212 may be made of varied materials, including for example, metal (e.g., aluminum, steel, Invar, Inconel), composites (e.g., carbon fiber, kevlar), glass and ceramics (e.g., Zerodur) or Teflon.

The first end-cap 302 is fixedly attached at the first open-end 216 and has an opening 306 with a center axis 310. The second end-cap 304 is fixedly attached at the second open-end 220 and has an opening 308 with a center axis 312 that is optically aligned with the center axis 310 of the first end-cap 302. The end-caps 302, 304 may be made of varied materials such as metals, glass, ceramic, Teflon or plastics (e.g., Delrin). The end-caps 302, 304 may be machined or 3D printed. As described further below with reference to FIG. 7, the end-caps 302, 304 are aligned relative to each other using optical alignment methods (instead of machine tolerances) and then permanently attached to the tube 212 using adhesive.

The first mirror 214 is removably coupled with the first end-cap 302 by a first mirror clamp assembly 314 such that when the first mirror 214 is coupled to the first end-cap 302, the center 318 of the first mirror is axially aligned with the center axis 310 of the first end-cap. The first end-cap 302 includes a mirror-landing surface 322 and the first mirror clamp assembly 314 includes a first body 324 having an opening 326 configured to removably receive the first mirror 214. The first body 324 is configured to be coupled to the first end-cap 302 to secure the first mirror 214 adjacent to the mirror-landing surface 322 of the first end-cap 302. In some embodiments, a sealing o-ring 328 is positioned between the first mirror 214 and the mirror-landing surface 322.

The first mirror clamp assembly 314 includes a centering o-ring 330. The centering o-ring positions the first mirror 214 in the opening 326 of the first body 324. In some embodiments the first body 324 of the first mirror clamp assembly 314 includes an inward-projecting feature 332 and a compression o-ring 334 that is positioned between the inward-projecting feature 332 and the centering o-ring 330. The compression o-ring 334 has a hardness greater than the sealing o-ring 328. The first mirror 214 is secured in place adjacent to the mirror-landing surface 322 of the first end-cap 302 using attachment bolts 356 that extend through holes 358 in the first body 324 to couple with holes 360 formed in the first end-cap. Tightening of the attachment bolts 356 within the holes 360 secures the first mirror 214 in place by compression forces.

Figure 3:
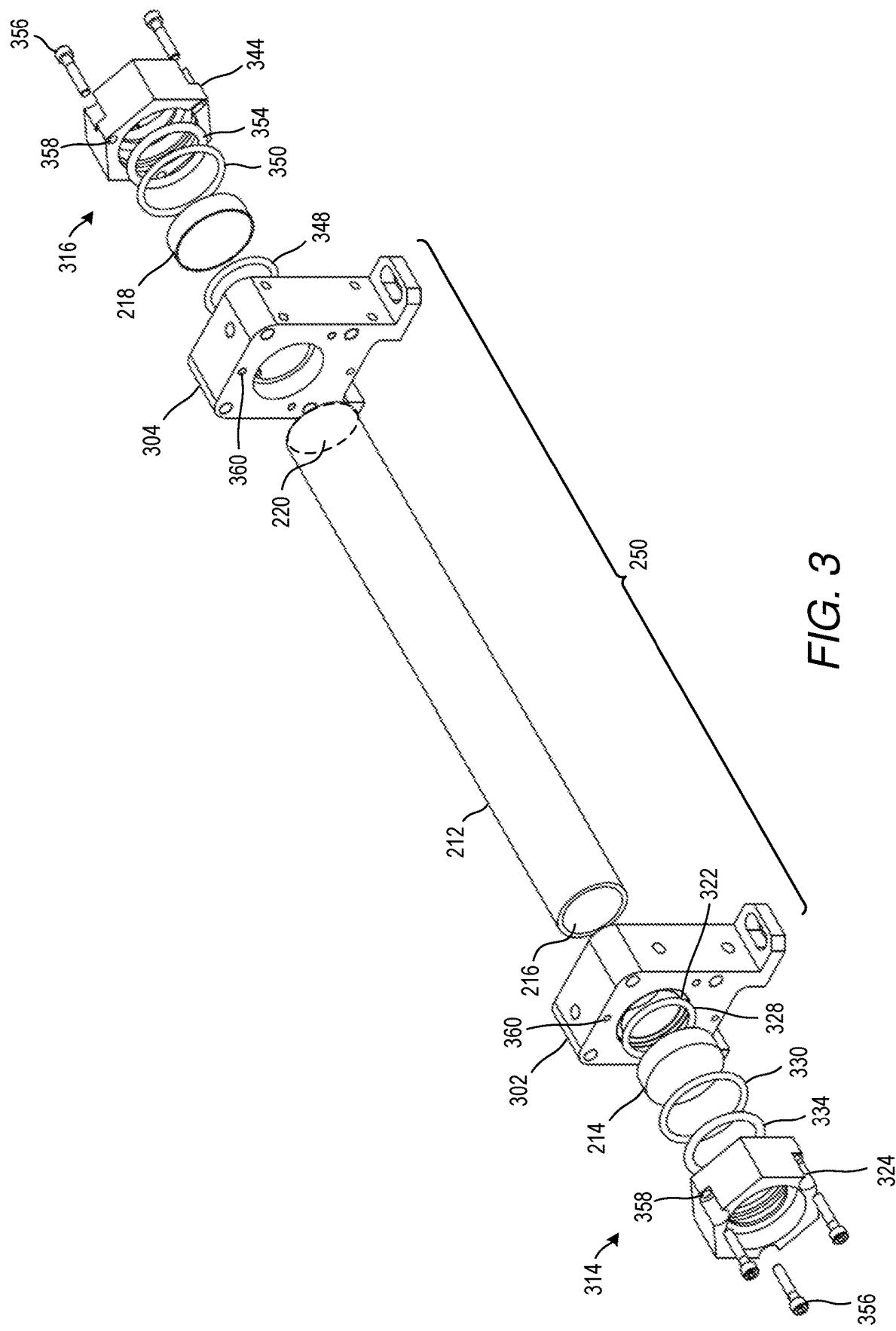
FIG. 3 is an exploded perspective illustration of the optical cavity of FIG. 2.

In the embodiment of FIG. 3, the first mirror clamp assembly 314 includes three attachment bolts 356 and three corresponding holes 358 that are evenly spaced apart around the first body 324 to align with respective holes 360 in the first end-cap 302. Respective diameters of the attachment bolts 356 and holes 358, 360 are within a tight tolerance of each other to restrain lateral movement and transverse movement of the first mirror 214 relative to the first end-cap 302 during assembly and reassembly (e.g., after mirror cleaning or replacement). The tight tolerances of the attachment bolts 356 and holes 358, 360 function to securely place the first mirror 214 within the first end-cap 302 such that: 1) the optical axis of the first mirror 214 is aligned with the optical axis of the second end-cap 304 and the second mirror 218 and 2) the first mirror 214 in place adjacent to the mirror-landing surface 322 of the first end-cap to preserve the lateral location of the first mirror relative to the second end-cap and the second mirror. In another embodiment, the attachment bolts 356 and holes 360 may be configured to further restrain the lateral movement and transverse movement of the first mirror 214 relative to the first end-cap 302. For example, the attachment bolts 356 and holes 360 may have conical or hemispherical configuration to enforce centering of the bolt within the hole during tightening.

The second mirror 218 is removably coupled with the second end-cap 304 by a second mirror clamp assembly 316 such that when the second mirror 218 is coupled to the second end-cap 304, the center 320 of the second mirror is axially aligned with the center axis 312 of the second end-cap. The second end-cap 304 includes a mirror-landing surface 342 (that is parallel to the mirror-landing surface 322 of the first end-cap 302) and the second mirror clamp assembly 316 includes a second body 344 having an opening 346 configured to removably receive the second mirror 218. The second body 344 is configured to be coupled to the second end-cap 304 to secure the second mirror 218 adjacent to the mirror-landing surface 342 of the second end-cap 304. In some embodiments a sealing o-ring 348 is positioned between the second mirror 218 and the mirror-landing surface 342.

The second mirror clamp assembly 316 includes a centering o-ring 350. The centering o-ring positions the second mirror 218 in the opening 326 of the second body 344. In some embodiments the second mirror clamp assembly 316 includes an inward-projecting feature 352 and a compression o-ring 354 that is positioned between the inward-projecting feature 352 and the centering o-ring 350. The compression o-ring 354 has a hardness greater than the sealing o-ring 348. The second mirror 218 is secured in place adjacent to the mirror-landing surface 342 of the second end-cap 304 using attachment bolts 356 that extend through holes 358 in the second body 344 to couple with holes 360 formed in the second end-cap. Tightening of the attachment bolts 356 within the holes 360 secures the second mirror 218 in place by compression forces.

In the embodiment of FIG. 3, the second mirror clamp assembly 316 includes three attachment bolts 356 and three corresponding holes 358 that are evenly spaced apart around the second body 344 to align with respective holes 360 in the second end-cap 304. Respective diameters of the attachment bolts 356 and holes 358, 360 are within a tight tolerance of each other to restrain lateral movement and transverse movement of the second mirror 218 relative to the second end-cap 304 during assembly and reassembly (e.g., after mirror cleaning or replacement). The tight tolerances of the attachment bolts 356 and holes 358, 360 function to securely place the second mirror 218 within the second end-cap 304 such that: 1) the optical axis of the second mirror 218 is aligned with the optical axis of the first end-cap 302 and the first mirror 214 and 2) the second mirror 218 in place adjacent to the mirror-landing surface 342 of the second end-cap to preserve the lateral location of the second mirror relative to the first end-cap and the first mirror. In another embodiment, the attachment bolts 356 and holes 360 may be configured to further restrain the lateral movement and transverse movement of the second mirror 218 relative to the second end-cap 304. For example, the attachment bolts 356 and holes 360 may have conical or hemispherical configuration to enforce centering of the bolt within the hole during tightening.

The mirrors 214, 218 are thus removably placeable within the end-caps 302, 304 such that repeatable transverse alignment (i.e., optical axis alignment) of the mirrors 214, 218 is established, together with repeatable lateral placement (i.e., the distance between the mirrors 214, 218). In other words, the respective configuration of the end-caps 302, 304 and the mirror clamp assemblies 314, 316 ensure that when a mirror 214, 218 is removed for cleaning or replacement, the mirror that is installed, e.g., either the same mirror after cleaning or a different mirror, is held in place within its respective end-cap 302, 304 in a manner that preserves both optical alignment and lateral spacing of the mirrors 214, 218.

Cell Assembly Process

Figure 5:
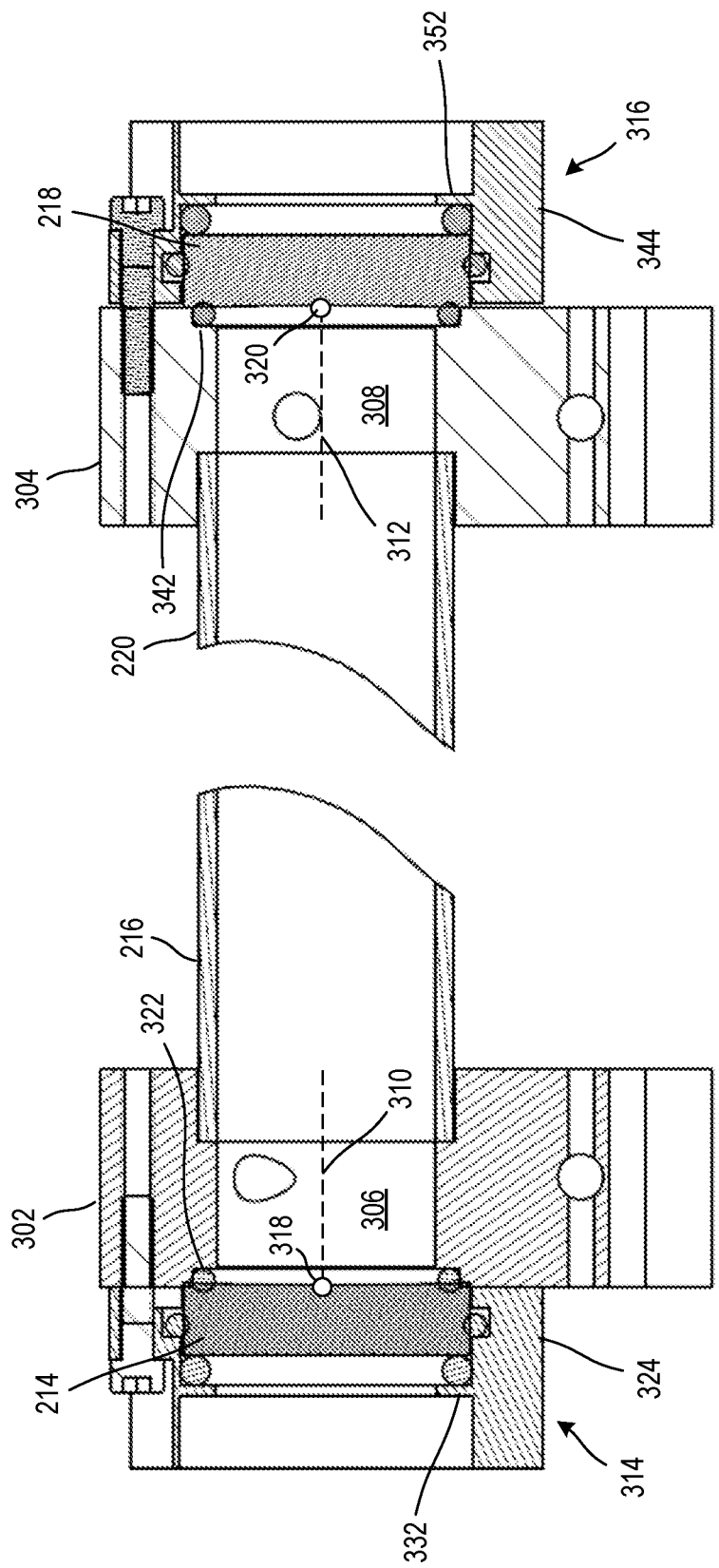
FIG. 5 is a side-view, cross-section illustration of the optical cavity of FIG. 2.
Figure 6:
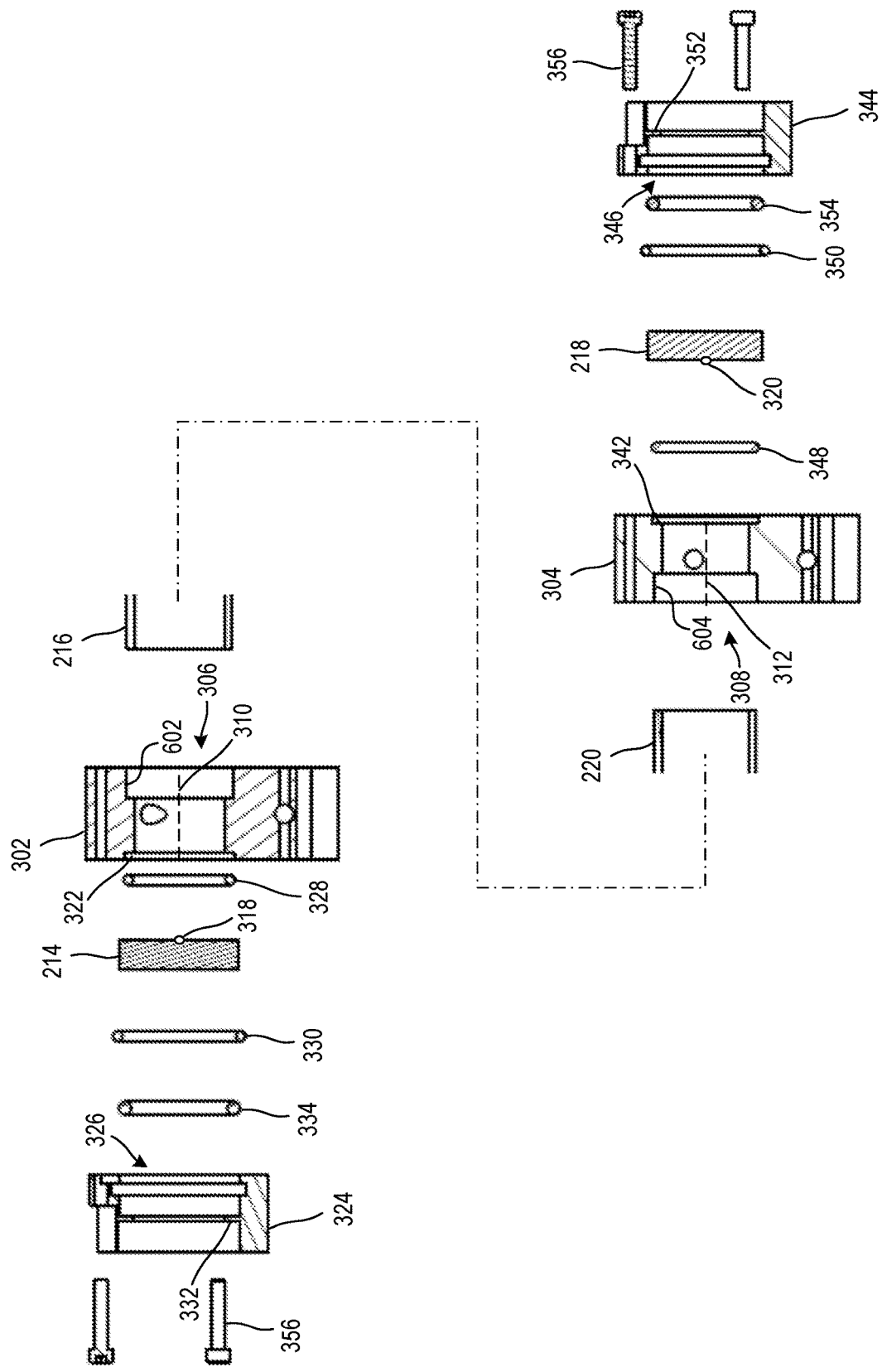
FIG. 6 is an exploded side-view, cross-section illustration of the optical cavity of FIG. 2
Figure 7:
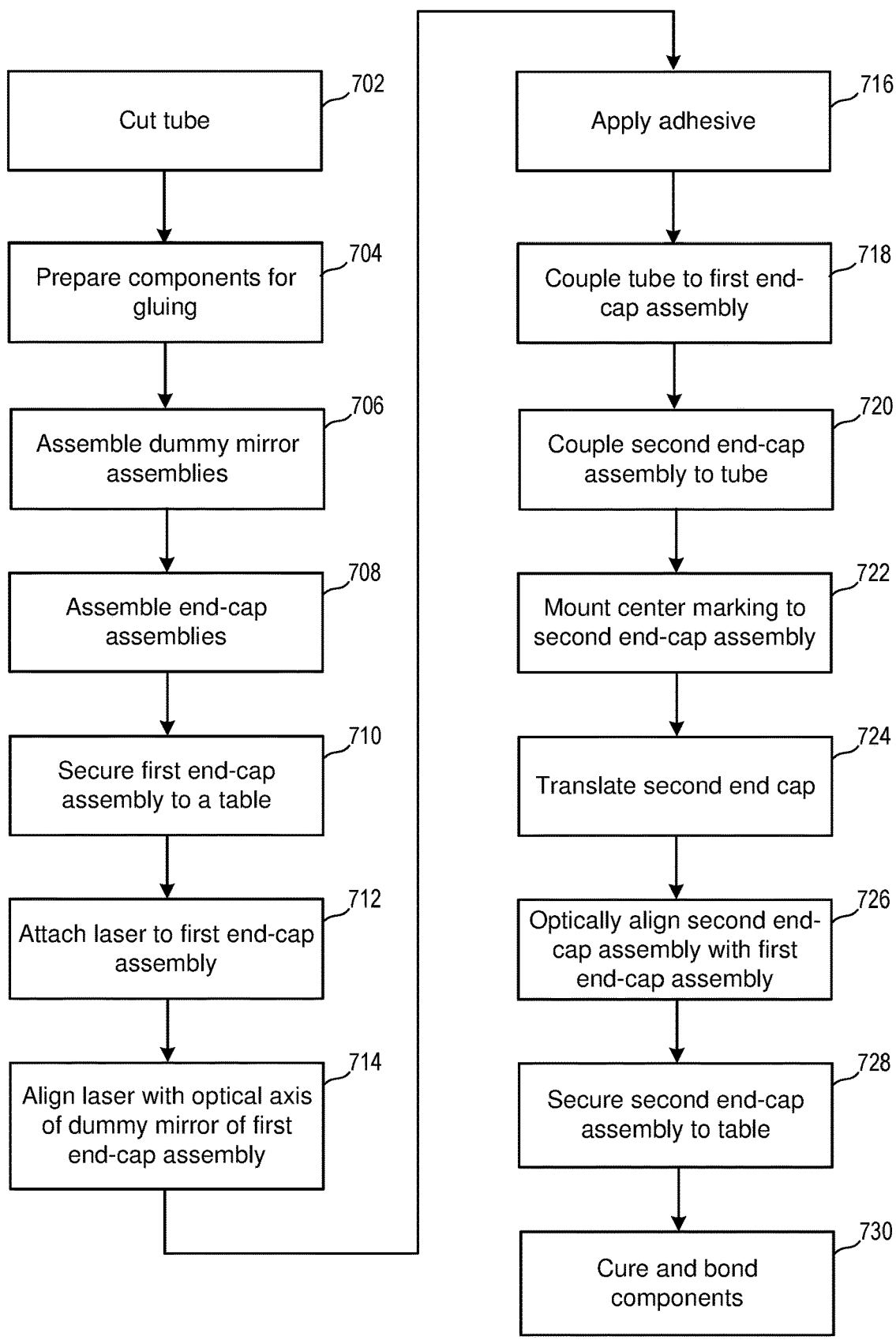
FIG. 7 is a flowchart of a method of assembling a cell of an optical cavity in accordance with embodiments disclosed herein.

FIG. 7 is a flowchart of a method of assembling an optical cavity, such as the one shown in FIGS. 2-6.

Figure 4:
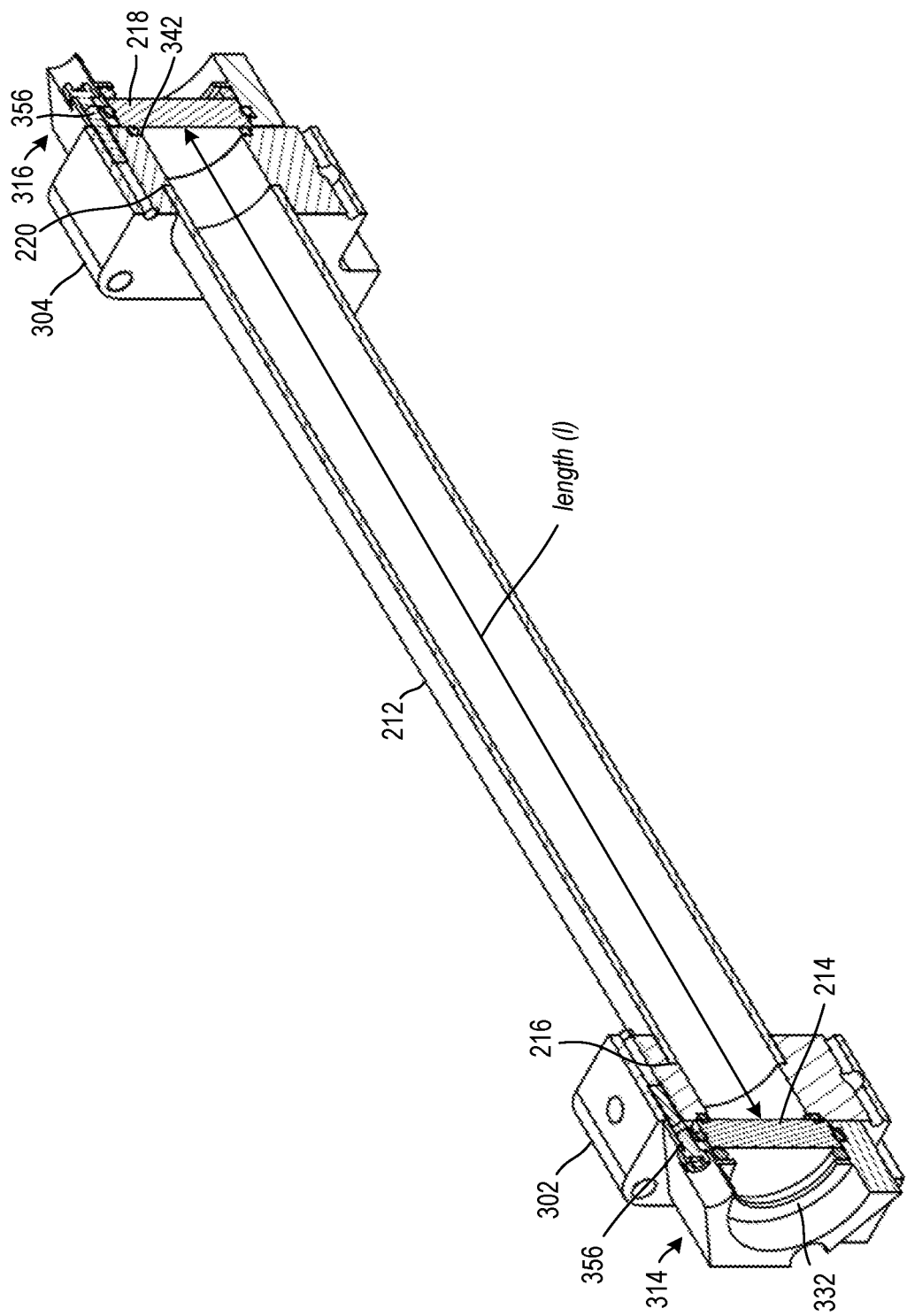
FIG. 4 is a cross-section illustration of the optical cavity of FIG. 2.

At block 702, a tube 212 is cut to a length corresponding to the desired optical cavity length. With reference to FIG. 4, the optical cavity length/is the distance between the center of the first mirror 214 and the center of the second mirror 218. An optical cavity 200 assembled in accordance with the method of FIG. 7 may have a length between 1 centimeter and 10 meters. In one example, for an optical cavity 200 having a length of 28 cm (11.02 in), the corresponding length for the tube 212 is 25.46 cm (10.02 in), with the offset from each open-end 216, 220 of the tube to the surface of its respective mirror 214, 218 being 1.27 cm for a total of 2.54 cm (1 in). The tube 212 may be cut using an end mill and the diamond coated mill. The tube 212 may be a carbon fiber tube.

At block 704, and with reference to FIGS. 4-6, components of the optical cavity 200 are prepared for gluing. To this end, the open-ends 216, 220 of the tube 212 are deburred with 150 grit sand paper. A portion, e.g., the last 0.64 cm (0.25 in), of each open-end 216, 220 of the tube 212 is roughened to improve adhesion. With reference to FIG. 6, interior surfaces 602, 604 of the first end-cap 302 and the second end-cap 304 are roughened with 150 grit sand paper. The tube 212 and the end-caps 302, 304 are cleaned and dried. For example, the components 212, 302, 304 are cleaned with a liquid soap and hot water and rinsed. Each component 212, 302, 304 is then cleaned and sonicated with isopropyl alcohol, and then baked at 150 F for 30 min to dry.

Figure 8A:
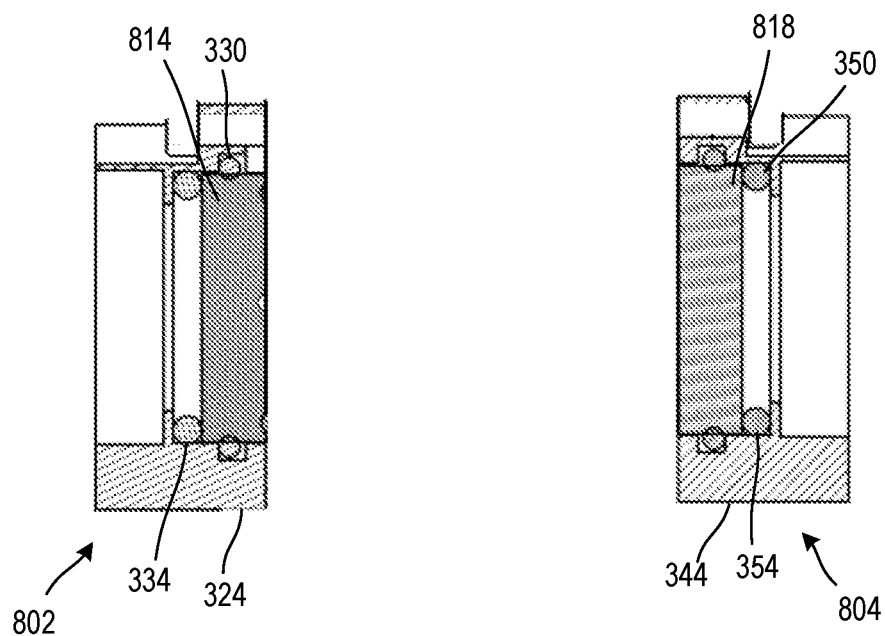

At block 706, and with reference to FIG. 8A, dummy mirror assemblies 802, 804 are assembled using partially reflective mirrors 814, 818 instead of highly reflective mirrors 214, 218. The partially reflective mirrors 814, 818 enable visibility of multiple reflections of light. For example, the partially reflective mirrors 814, 818 may have a reflectivity of about 50%. To this end, a first partially reflective mirror 814 is placed in a first body 324 together with a compression o-ring 334 and a centering o-ring 330 to form a first dummy mirror assembly 802. A second partially reflective mirror 818 is placed a second body 344 together with a compression o-ring 354 and a centering o-ring 350 to form a second dummy mirror assembly 804.

Figure 8B:
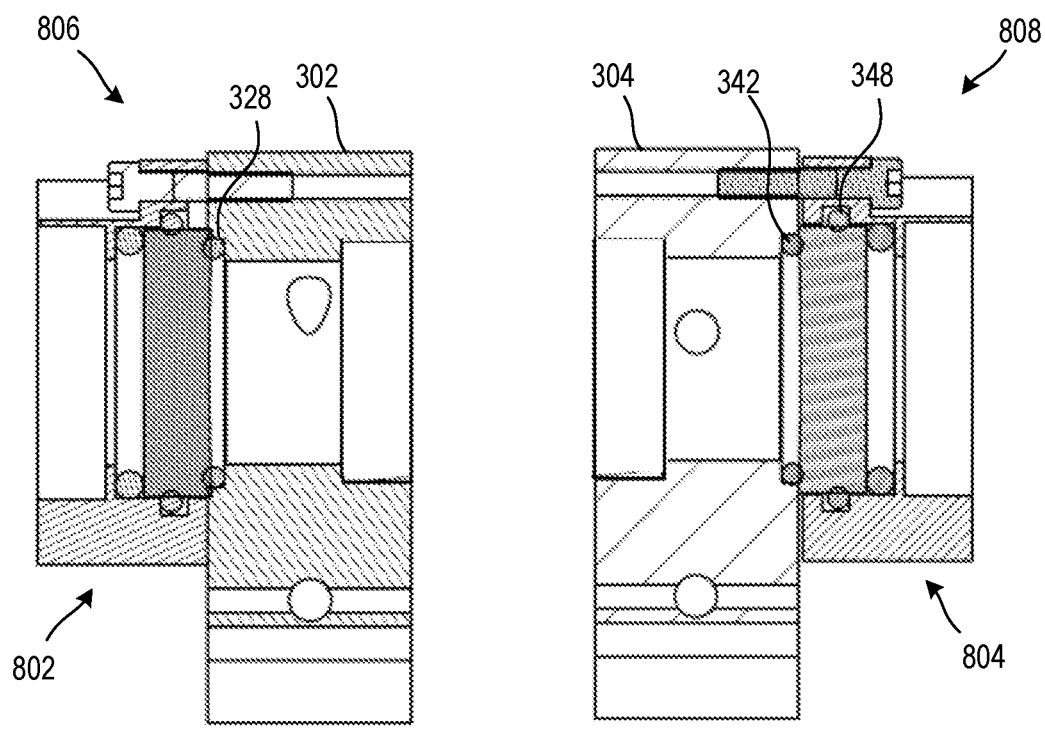

At block 708, and with reference to FIG. 8B, two end-cap assemblies 806, 808 are assembled. To this end, the first dummy mirror assembly 802 is attached to a first end-cap 302 together with a sealing o-ring 328 to form a first end-cap assembly 806. The second dummy mirror assembly 804 is attached to a second end-cap 304 together with a sealing o-ring 348 to form a second end-cap assembly 808. The two end-cap assemblies 806, 808 make a complete, rigid and repeatable mirror plus end-cap assembly.

Figure 8C:
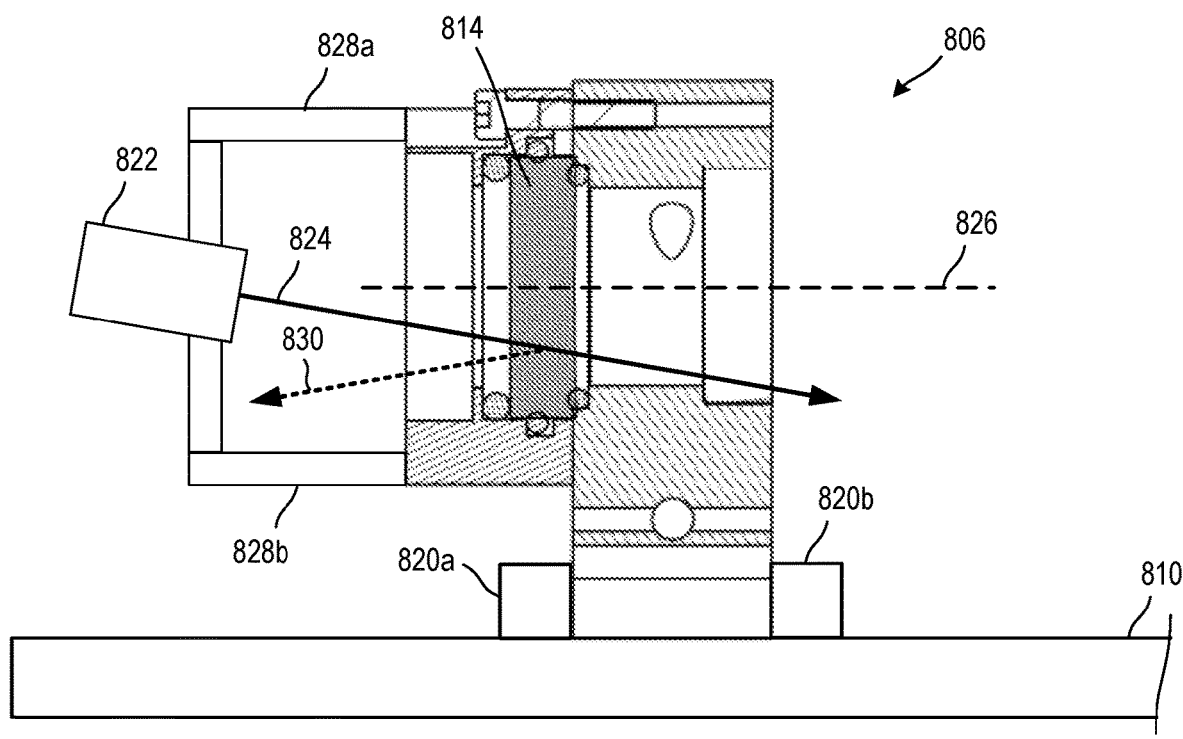

At block 710, and with reference to FIG. 8C, the first end-cap assembly 806 is secured to a table 810 using clamps 820a, 820b.

At block 712, and with continued reference to FIG. 8C, a laser source 822 is aligned relative to the first partially reflective mirror 814 such that transverse movement (up/down movement in FIG. 8C) of the laser beam 824 falls on the optical axis 826 of the first partially reflective mirror 814, where the optical axis is the axis normal to the surfaces of the first partially reflective mirror. To this end, the laser source 822 can be attached to the first end-cap assembly 806 using mechanical rods 828a, 828b. In FIG. 8C, the laser source 822 is positioned such that the retro-reflected laser 830 is not aligned with the optical axis 826.

Figure 8D:
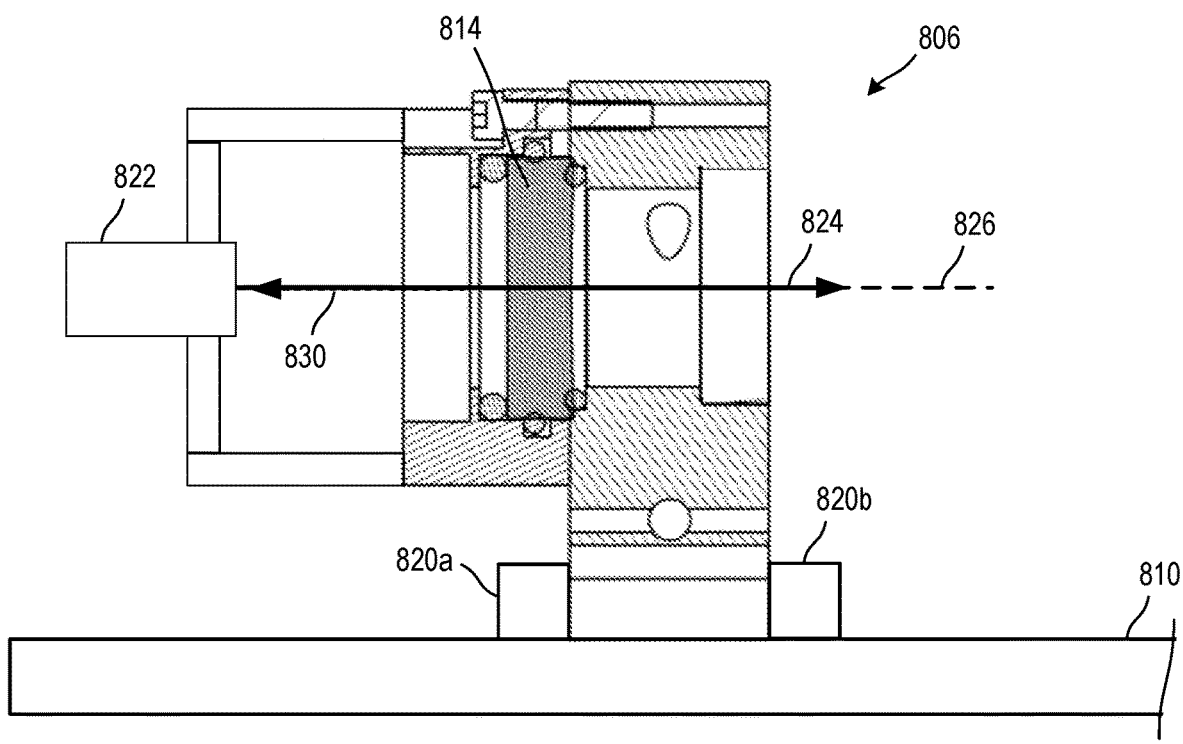

At block 714, and with reference to FIG. 8D, the position of the laser source 822 is adjusted until the retro-reflected laser 830 is aligned such that the laser beam 824 is aimed along the optical axis 826 of the first partially reflective mirror 814.

At block 716, and with reference to FIG. 8E, adhesive is applied to the first open-end 216 the tube 212 and the second open-end 220 of the tube.

At block 718, and with reference to FIG. 8F, the first open-end 216 of the tube 212 is mechanically coupled to the first end-cap assembly 806. To this end, the first open-end 216 of the tube 212 is inserted into the opening 306 of first end-cap assembly 806. The tube 212 is spun to distribute the adhesive uniformly around and between the outer surface of the first open-end 216 of the tube 212 and the interior surface of the first end-cap 302. At this stage, the second open-end 220 of the tube 212 is supported by hand in free space.

Figure 8G:
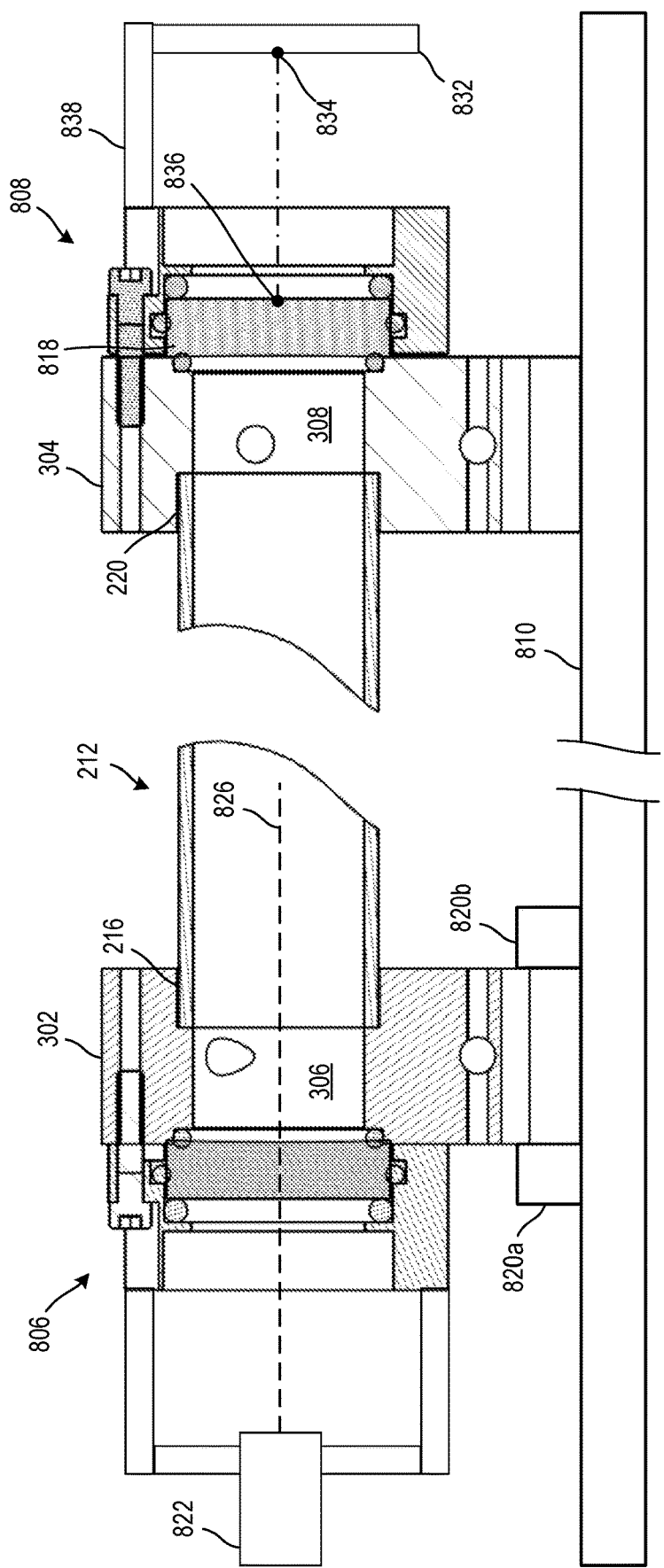

At block 720, and with reference to FIG. 8G, the second end-cap assembly 808 is coupled to the tube 212. To this end, the second end-cap assembly 808 is placed relative to the tube 212 such that the second open-end 220 of the tube is received by the opening 308 of the second end-cap assembly. The tube 212 is spun to distribute the adhesive uniformly around and between the outer surface of the second open-end 220 of tube and the interior surface of the second end-cap 304.

At block 722, and with continued reference to FIG. 8G, a marker 832 is aligned relative to the second end-cap assembly 808 such that an iris/aperture/center 834 of the marker coincides with the mechanical center 836 of the second partially reflective mirror 818. For example, the marker 832 may be mechanically mounted to rods 838 that screw into the second end-cap 304.

Figure 8H:
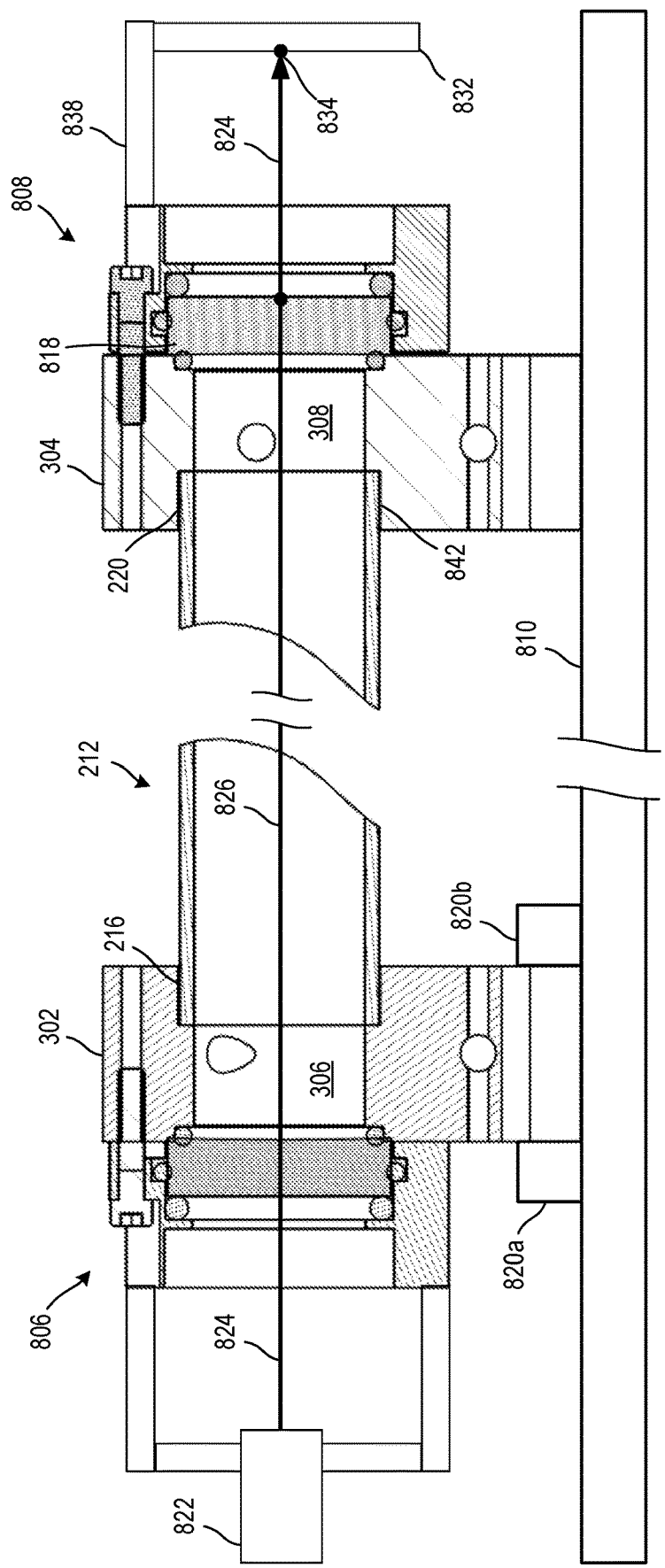

At block 724, and with reference to FIG. 8H, the second end-cap assembly 808, which is not mounted to the table 810, is centered on the optical axis 826. To this end, an alignment laser beam 824 is output by the laser source 822 and the second end-cap assembly 808 is translated transverse (e.g., up/down, side-to-side) to the optical axis 826 and relative to the second open-end 220 of the tube 212 to center the alignment laser beam 824 on the center 834 of the marker. It is noted that translation of the second end-cap assembly 808 relative to the second open-end 220 of the tube 212 is possible because the adhesive at the second open-end 220 of the tube 212 has not yet cured. Furthermore, while not apparent in FIG. 8H, a space or gap 842 separates the outer surface of the tube 212 and the inner wall of the second end-cap 304. This gap 842 is filled with uncured adhesive at this stage of the assembly process and thus allows for translation of the second end cap. For example, a gap 842 between the outer surface of the tube 212 and the inner wall of second end-cap 304 of 0.00508 cm (0.002 in) to 0.127 cm (0.05 in) allows for the required translational (i.e., transverse movement) and tip/tilt (i.e., angular movement) operations.

Figure 8I:
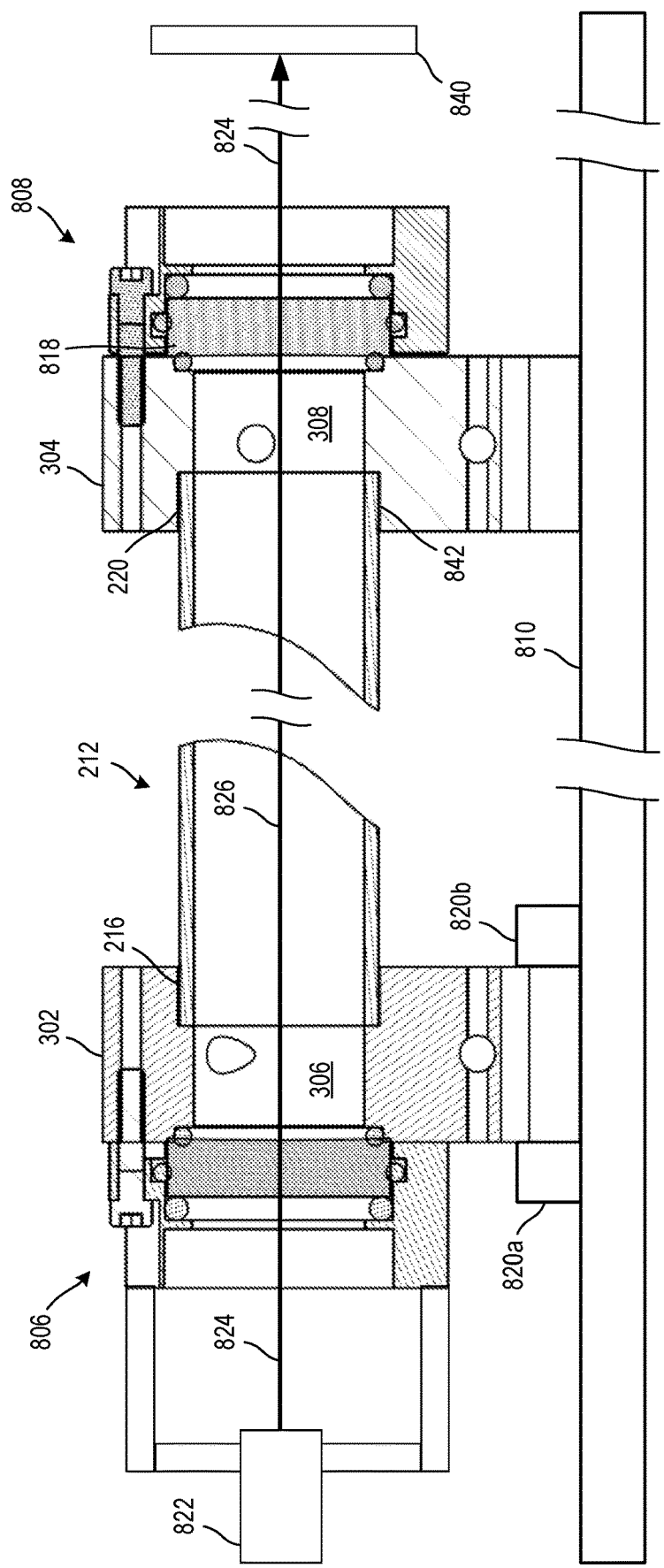

At block 726, and with reference to FIG. 8I, the second end-cap assembly 808 is optically aligned with the first end-cap assembly 806. To this end, the laser source 822 attached to the first end-cap assembly 806 outputs a laser beam 824 toward the second end-cap assembly 808. Multiple reflections of the laser beam 824 between the first partially reflective mirror 814 of the first end-cap assembly 806 and the second partially reflective mirror 818 of the second end-cap assembly 808 are observed on a screen 840 placed about 1 m away from the second end-cap assembly. The angle (or tip/tilt) of the second end-cap assembly 808 is adjusted to achieve alignment of the multiple reflections. While not apparent in FIG. 8I, the gap 842 between the outer surface of the tube 212 and the inner wall of the second end-cap 304 allows for angular adjustment of the second end cap. Again, this gap 842 is filled with uncured adhesive at this stage of the assembly process.

Figure 9B:
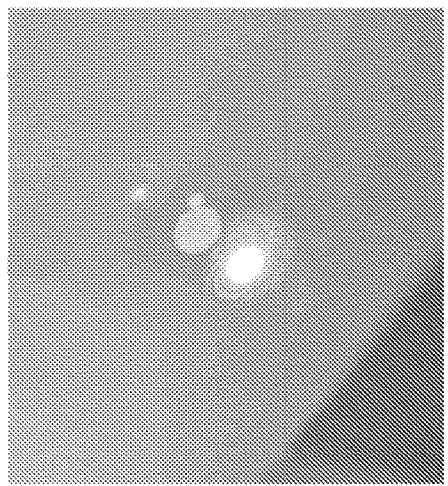
FIG. 9B is an image of a spot pattern resulting from the alignment of FIG. 9A.
Figure 9D:
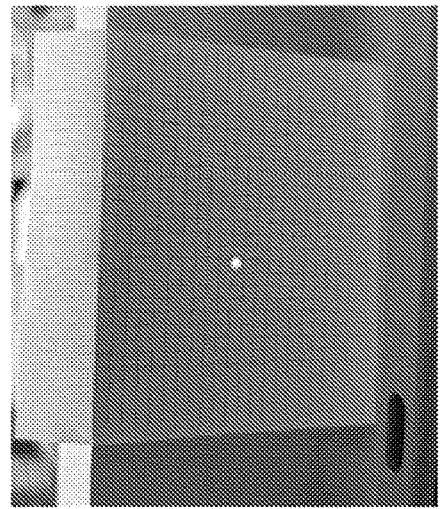
FIG. 9D is an image of a spot pattern resulting from the alignment of FIG. 9A.
Figure 9A:
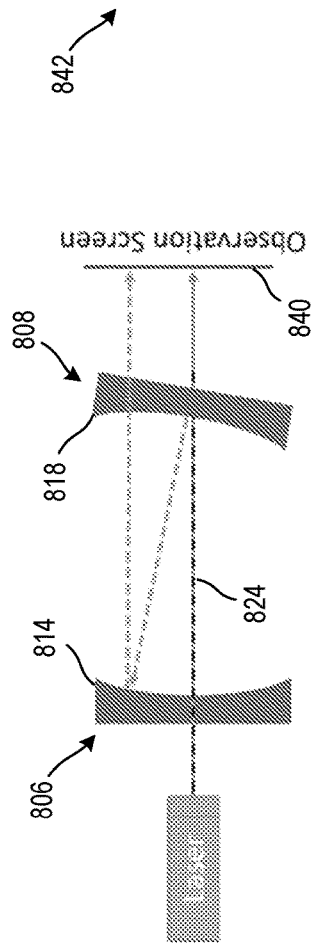
FIG. 9A is a schematic illustration of an alignment step of the method of FIG. 7.
Figure 9C:
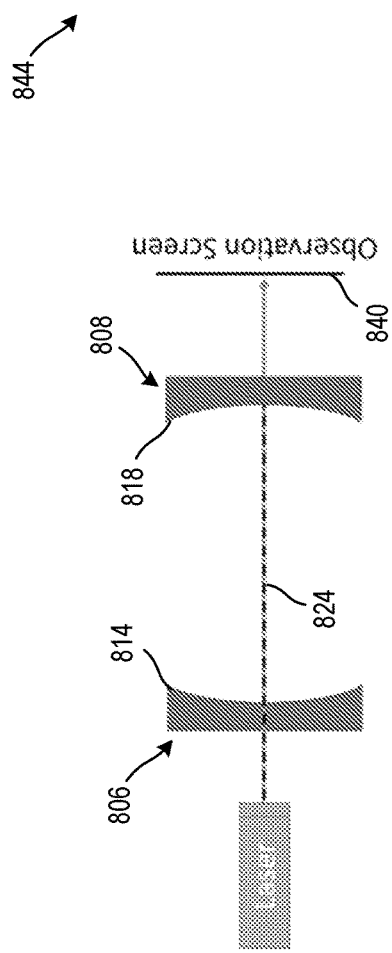
FIG. 9C is a schematic illustration of an alignment step of the method of FIG. 7.

With reference to FIGS. 9A and 9B, when the second end-cap assembly 808 is not optically aligned with the first end-cap assembly 806, multiple reflections of the laser beam 824 between the first partially reflective mirror 814 and the second partially reflective mirror 818 appear on a screen 840 as separate spots of light. With reference to FIGS. 9C and 9D, when the second end-cap assembly 808 is optically aligned with the first end-cap assembly 806, multiple reflections of the laser beam 824 between the first partially reflective mirror 814 and the second partially reflective mirror 818 overlap and appear on a screen 840 as a single spot of light.

At block 728, after the second end-cap assembly 808 is optically aligned with the first end-cap assembly 806, the second end-cap assembly 808 is secured to the table 810 to maintain the spot overlap shown in FIG. 9D.

At block 730, the assembled optical cavity is cured and bonded. To this end, the adhered components of the cavity are cured for 12-24 hours. After curing, the optical cavity is inspected for any movement of components and unclamped from the table 810. The optical cavity is then oven cure at 150 F for 60 min to maximize bond strength.

After curing is completed, the first dummy mirror assembly 802 is decoupled from the first end-cap 302 and the second dummy mirror assembly 804 is decoupled from the second end-cap 304 to provide a cell 250 having end-caps that are optically aligned and permanently attached to opposite ends of the tube such that respective mirror-landing surfaces of the end-caps are substantially parallel.

Figure 10:
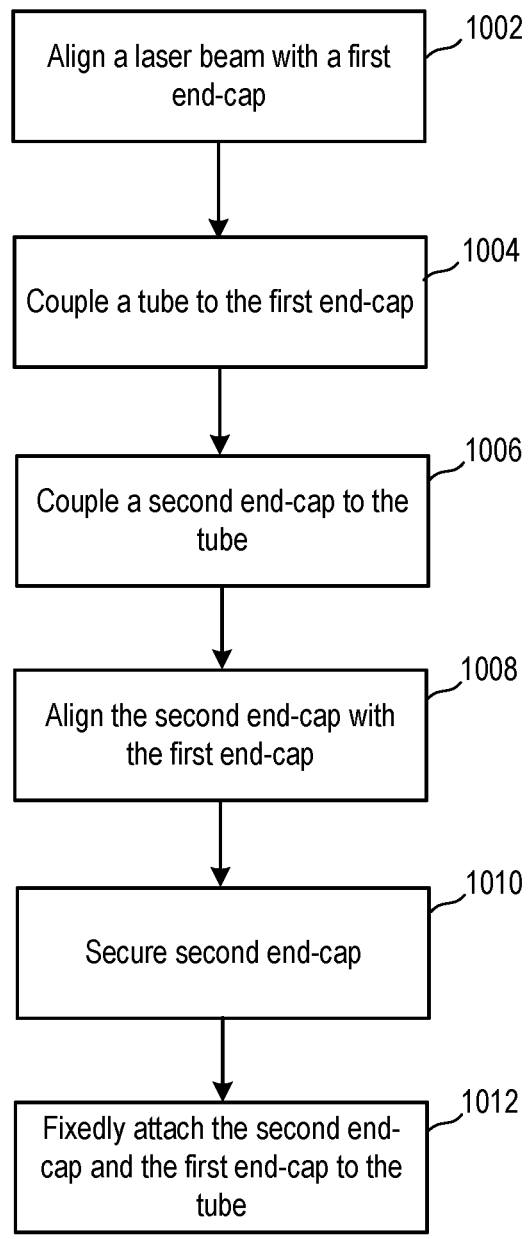
FIG. 10 is a flowchart of a method of assembling a cell of an optical cavity in accordance with embodiments disclosed herein.

With reference to FIG. 10, a method of assembling a cell for an optical cavity in accordance with embodiments disclosed herein includes:

At block 1002, a laser beam is aligned with a first end-cap. To this end the laser beam is aligned with an optical axis of a first mirror that is secured in a first end-cap, which is secured in place relative to a surface. As part of this alignment process, a source of the laser beam is attached to the first end-cap, and the alignment of the source is adjusted relative to the first mirror 814 such that transverse movement of the laser beam 824 falls on the optical axis 826 of the first mirror 814.

At block 1004, a first open-end of a tube is coupled to the first end-cap. To this end, adhesive is applied to the first open-end and the first open-end is inserted into an opening of the first end-cap.

At block 1006, a second end-cap is coupled to a second open-end of the tube. To this end, adhesive is applied to the second open-end and the opening of the second end-cap is placed over the second open-end of the tube.

At block 1008, the second end-cap is optically aligned with the first end-cap. To this end, a laser beam is directed from the source toward a second mirror secured in the second end-cap. And the second end-cap is translated until an alignment of multiple reflections of the laser beam between the first mirror and the second mirror is obtained. For example, an alignment of multiple reflections of the laser beam between the first mirror and the second mirror may be observed as a single spot of light in a spot pattern.

At block 1010, the second end-cap is secured in place relative to the surface.

At block 1012, the first open end of the tube is fixedly secured to the first end-cap and the second open end of the tube is fixedly secured to the second end-cap. To this end, an adhesive between the first open-end of the tube and the first end-cap is cured, and an adhesive between the second open-end of the tube and the second end-cap is cured. The adhesive may be the adhesive applied in blocks 1004 and 1006.

The optical cavity and method of assembly disclosed herein have the following numerous advantages.

The end-caps 302, 304 are optically pre-aligned and permanently affixed (or fixedly attached) to the tube during assembly. Additionally, because the end-cap-to-end-cap (or, equivalently, mirror-to-mirror) alignment is achieved with a laser beam prior to complete adhesion, the alignment can be more accurate than machined cells. The metal-glass interface between the mirrors 214, 218 and the end-caps 302, 304 of the optical cavity 200 allows for repeated removal and insertion of the mirrors (e.g., for cleaning) while maintaining end-cap-to-end-cap (or, equivalently, mirror-to-mirror) optical alignment. The metal-glass interface between the mirrors 214, 218 and the end-caps 302, 304 provides an optical cavity 200 that is robust to shock, vibration, and thermal fluctuations.

The component cost of the optical cavity 200 is reduced relative to the approaches mentioned in the background of this disclosure because the size of the machined object is reduced, the tolerances may be relaxed, and the long bore step is eliminated. An optical cavity 200 of much longer length can be fabricated while meeting the strictest face parallelism requirements of multi-pass and cavity enhanced absorption spectroscopies.

The weight of the optical cavity 200 is reduced relative to the approaches mentioned in the background of this disclosure because components of the optical cavity, such as the tube 212, can be made from alternative materials (e.g., carbon fiber). The temperature sensitivity of the optical cavity 200 can be reduced components of the optical cavity, such as the tube 212, can be made from low thermal coefficient of expansion materials.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of assembling a cell for an optical cavity, the method comprising:
    aligning a laser beam with an optical axis of a first mirror secured in a first end-cap that is secured in place relative to a surface;
    coupling a first open-end of a tube to the first end-cap by applying adhesive to the first open-end, and inserting the first open-end of the tube into an opening of the first end-cap;
    coupling a second end-cap to a second open-end of the tube by applying adhesive to the second open-end, and placing the opening of the second end-cap over the second open-end of the tube;
    optically aligning the second end-cap with the first end-cap by directing the laser beam toward a second mirror secured in the second end-cap, and translating the second end-cap until an alignment of multiple reflections of the laser beam between the first mirror and the second mirror is obtained;
    securing the second end-cap in place relative to the surface; and
    fixedly attaching the first open-end of the tube to the first end-cap and the second open-end of the tube to the second end-cap.

2. The method of claim 1, wherein aligning a laser beam with an optical axis of a first mirror comprises:
    attaching a source of the laser beam to the first end-cap; and
    adjusting the alignment of the source relative to the first mirror such that transverse movement of the laser beam falls on the optical axis of the first mirror.

3. The method of claim 1, wherein an alignment of multiple reflections of the laser beam between the first mirror and the second mirror is observed as a single spot of light in a spot pattern.

4. The method of claim 1, wherein fixedly attaching the first open-end of the tube to the first end-cap and the second open-end of the tube to the second end-cap comprises:
    curing the adhesive between the first open-end of the tube and the first end-cap; and
    curing the adhesive between the second open-end of the tube and the second end-cap.

5. The method of claim 4, further comprising:
    removing the first mirror from the first end-cap; and
    removing the second mirror from the second end-cap.

6. An optical cavity comprising:
    a tube with a first open-end and a second open-end;
    a first end-cap fixedly attached at the first open-end and having an opening with a center axis;
    a second end-cap fixedly attached at the second open-end and having an opening with a center axis that is optically aligned with the center axis of the first end-cap;
    a first mirror removably coupled with the first end-cap by a first mirror clamp assembly such that the center of the first mirror is axially aligned with the center axis of the first end-cap; and
    a second mirror removably coupled with the second end-cap by a second mirror clamp assembly such that the center of the second mirror is axially aligned with the center axis of the second end-cap.

7. The optical cavity of claim 6, wherein:
    the first end-cap comprises a first mirror-landing surface; and
    the first mirror clamp assembly comprises a first body having an opening configured to removably receive the first mirror and to be coupled to the first end-cap to secure the first mirror adjacent to the first mirror-landing surface of the first end-cap.

8. The optical cavity of claim 7, wherein the first mirror is secured in place adjacent to the first mirror-landing surface by compression forces.

9. The optical cavity of claim 8, further comprising a sealing structure positioned between the first mirror and the first mirror-landing surface.

10. The optical cavity of claim 7, wherein the first mirror clamp assembly comprise a centering o-ring configured to position the first mirror in the opening of the first body.

11. The optical cavity of claim 7, wherein the first body of the first mirror clamp assembly comprises:
    an inward-projecting feature; and
    a compression o-ring positioned between the inward-projecting feature and a centering o-ring.

12. The optical cavity of claim 6, wherein:
    the second end-cap comprises a second mirror-landing surface; and
    the second mirror clamp assembly comprises a second body having an opening configured to removably receive the second mirror and to be coupled to the second end-cap to secure the second mirror adjacent the second mirror-landing surface of the second end-cap.

13. The optical cavity of claim 12, wherein the second mirror is secured in place adjacent to the second mirror-landing surface by compression forces.

14. The optical cavity of claim 13, further comprising a sealing structure positioned between the second mirror and the second mirror-landing surface.

15. The optical cavity of claim 13, wherein the second mirror clamp assembly comprise a centering o-ring configured to position the second mirror in the opening of second the body.

16. The optical cavity of claim 13, wherein the second body of the second mirror clamp assembly comprises:
- an inward-projecting feature; and
- a compression o-ring positioned between the inward-projecting feature and a centering o-ring.

* * * * *